US012718041B2

(12) United States Patent
Sawata

(10) Patent No.: US 12,718,041 B2
(45) Date of Patent: Aug. 25, 2026

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Naohiro Sawata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/314,232

(22) Filed: May 9, 2023

(65) Prior Publication Data

US 2024/0160875 A1 May 16, 2024

(30) Foreign Application Priority Data

Nov. 10, 2022 (JP) ................................ 2022-180460

(51) Int. Cl.
*G06K 15/02* (2006.01)
*G06F 3/12* (2006.01)

(52) U.S. Cl.
CPC ....... *G06K 15/1823* (2013.01); *G06F 3/1219* (2013.01); *G06F 3/1229* (2013.01)

(58) Field of Classification Search
CPC .. G06K 15/1823; G06F 3/1219; G06F 3/1229
See application file for complete search history.

(56) References Cited

U.S. PATENT DOCUMENTS 8,985,580 B2 * 3/2015 Ozaki ................ G03G 15/5087 358/1.15
2002/0174104 A1 * 11/2002 Yokoyama ......... G03G 15/5079

FOREIGN PATENT DOCUMENTS

JP 2006-023918 A 1/2006

* cited by examiner

*Primary Examiner* — Ibrahim Siddo
(74) *Attorney, Agent, or Firm* — Oliff PLC

(57) ABSTRACT

An information processing apparatus includes a processor configured to: acquire plan information indicating a plan for a printing process to be executed by a printer in a predetermined processing time; derive planned quantity information on a basis of the plan information, the planned quantity information indicating a printing target quantity in executing the printing process according to the plan; acquire actual quantity information indicating a printing target quantity of a printing target placed in the printer, the printing target quantity allowing the printing process to be executed; on a basis of the planned quantity information and the actual quantity information, estimate estimated quantity information indicating a printing target quantity for implementing the plan; and perform control to make a notification of the estimated quantity information.

10 Claims, 9 Drawing Sheets

10
16E
16D
16C
16B
16A
12A
12B
12
13
14B
14A

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-180460 filed Nov. 10, 2022.

BACKGROUND

(i) Technical Field

The present disclosure relates to an information processing apparatus and a non-transitory computer readable medium.

(ii) Related Art

Technology for reducing printing interruptions caused by shortage of sheets to be used for printing is known (for example, refer to Japanese Unexamined Patent Application Publication No. 2006-023918). In the technology, in a printer including a detection unit that detects the number of printing sheets loaded in the printer and a prediction unit that predicts the number of printable sheets from a remaining ink amount, the number of actually printable sheets is predicted from the number of printing sheets designated by a user, the number of detected loaded printing sheets, and the number of printable sheets predicted from the remaining ink amount.

SUMMARY

In some cases, a plan for printing processes to be executed by a printer in a predetermined processing time such as one day is made in advance, and the printing processes are carried out according to the plan. In each printing process, for example, processes for supplying a printing target such as a sheet and for printing a character, an image, and the like on the printing target are executed. The printing process requires advance preparation of the printing target to be used to execute the printing process. However, to execute the printing process according to the plan, the number of sheets to implement the plan is difficult to comprehend when the plan is implemented. Using up the printing targets prepared in advance leads to an interruption of the printing process.

Aspects of non-limiting embodiments of the present disclosure relate to providing an information processing apparatus and a non-transitory computer readable medium that are enabled to reduce printing process interruptions in implementing printing processes in a predetermined processing time as compared with a case where printing targets such as sheets are prepared on the basis of only printer information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire plan information indicating a plan for a printing process to be executed by a printer in a predetermined processing time; derive planned quantity information on a basis of the plan information, the planned quantity information indicating a printing target quantity in executing the printing process according to the plan; acquire actual quantity information indicating a printing target quantity of a printing target placed in the printer, the printing target quantity allowing the printing process to be executed; on a basis of the planned quantity information and the actual quantity information, estimate estimated quantity information indicating a printing target quantity for implementing the plan; and perform control to make a notification of the estimated quantity information.

BRIEF DESCRIPTION OF THE DRAWINGS

An exemplary embodiment of the present disclosure will be described in detail based on the following figures, wherein.

DETAILED DESCRIPTION

Figure 1:
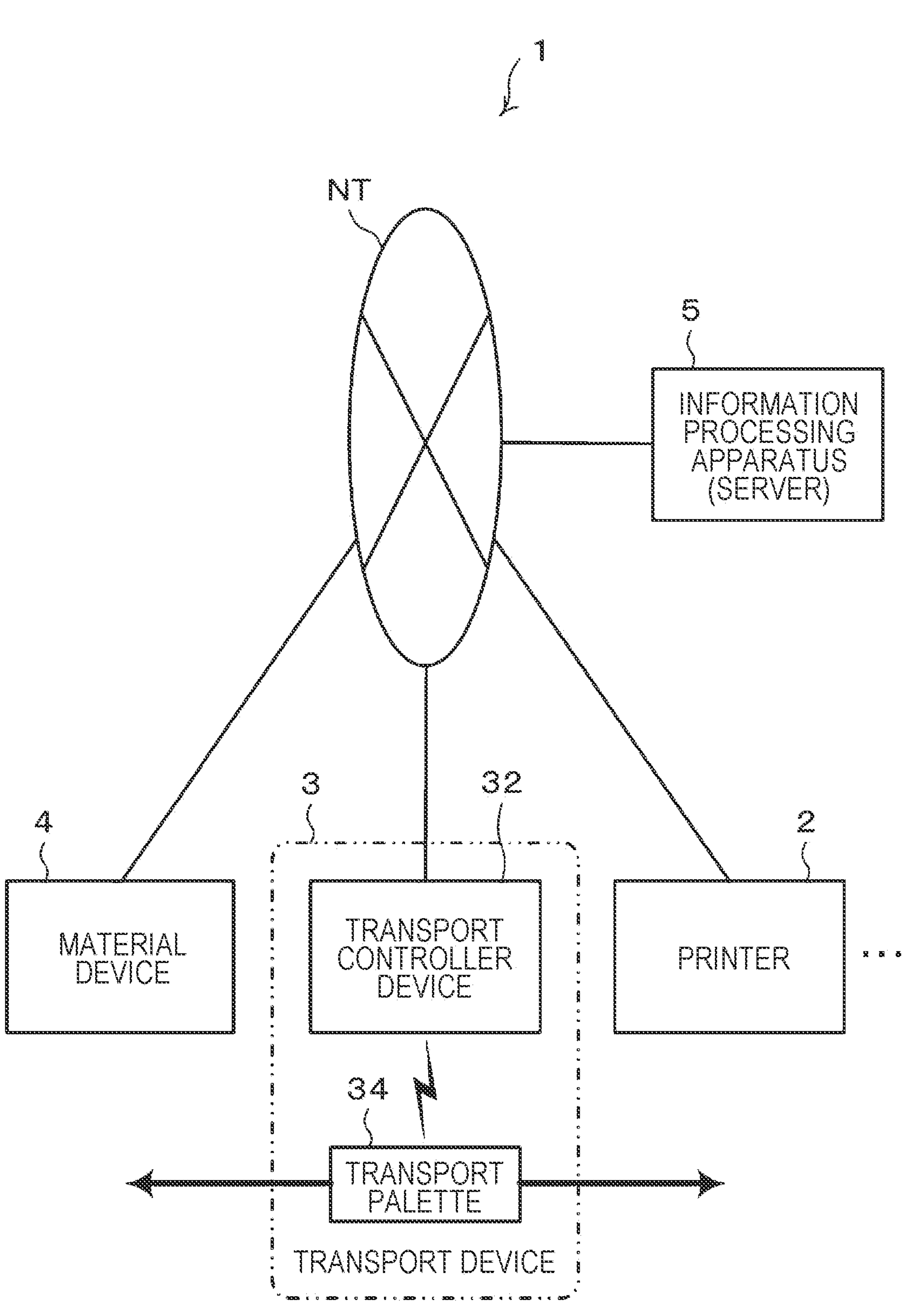
FIG. 1 is a view illustrating the schematic configuration of an information processing system according to an exemplary embodiment.

Hereinafter, an example of an exemplary embodiment for implementing technology of the present disclosure will be described in detail with reference to the drawings. A component and a process that exert the same operation, effect, and function are denoted by the same reference numerals throughout the drawings, and redundant explanation thereof is appropriately omitted on occasions. The drawings are merely schematically illustrated to such a degree that the technology of the present disclosure is sufficiently understood. Accordingly, the technology of the present disclosure is not limited to the illustrated examples. In addition, in this exemplary embodiment, explanation of a configuration not related to the present disclosure directly and a known configuration is omitted in some cases.

In the present disclosure, the term “printing target” conceptually includes a material used in executing a printing process, for example, a sheet on which printing is to be performed, resultant matter resulting from the printing process, and a subsidiary printing material such as a component or a material used for the printing process. The term “printing target quantity" conceptually includes the quantity of a printing target as well as the type and the quantity of the printing target.

FIG. 1 is a view illustrating the schematic configuration of an information processing system 1 according to the exemplary embodiment for implementing the technology of the present disclosure.

The information processing system 1 illustrated in FIG. 1 includes printers 2 including an image forming system 10 (FIG. 2), a transport device 3 serving as a responsible device, a material device 4, and an information processing apparatus 5 serving as an example of an information processing apparatus of the present disclosure. For example, a server computer and a general computer such as a personal computer (PC) are applied to the information processing apparatus 5.

The information processing apparatus 5 is configured to be connectable to each of the printers 2 including the image forming system 10, the transport device 3, and the material device 4 via a network NT. Networks such as the Internet, a public communication network such as a telephone network, a local area network (LAN), and a wide area network (WAN) are applied to an example of the network NT. In addition, at least one of a wired network and a wireless communication network is applicable to the network NT. The information processing apparatus 5 may be formed as a virtual apparatus in a virtual space such as a cloud network.

In this exemplary embodiment, for example, a sheet is applied to a printing target in the printer 2, and a case where the quantity of sheets is applied as an example of the printing target quantity is described. In addition, a case where the number of sheets or the number of sheets based on the type of the sheets is applied to the sheet quantity is described in this exemplary embodiment.

Each printer 2 is an apparatus having image forming functions such as a copying function, a printing function, a scanning function, and a faxing function. For example, in response to receiving a print job from a terminal device (not illustrated) such as a PC, the printer 2 executes a printing process for printing an image on one or more sheets P on the basis of the print job. The configuration of the printer 2 will be described later.

The transport device 3 is a device that performs control related to transportation of the sheets P to be used in the printer 2 from the material device 4 as a transport source to the printer 2 as a transport destination. The transport device 3 may include a transport controller device 32 and a transport palette 34. To execute an automatic process for transporting the sheets P with the transport palette 34, the transport controller device 32 may derive a transport path for the sheets P and control the transportation with the transport palette 34. Wired or wireless connection between the transport controller device 32 and the movable transport palette 34 is thus performed, and the sheets P are transported by using the movement of the transport palette 34.

The transport device 3 may acquire, in advance, the quantity of sheets to be used, that is, the type and the number of sheets and transport the sheets P based on the type and the number of sheets. The transport device 3 may also include a picking device that takes out the sheets P to be transported from the transport source (the material device 4) and supplies the sheets P to the transport destination (the printer 2). In a case where a user transports the sheets P, the transport controller device 32 may execute a process for providing information regarding the transport path for the sheets P.

In the transport device 3, various functions related to the sheet transportation may be controlled by a controller including a CPU (not illustrated) but are implementable by using a known configuration including a general-purpose device, and thus detailed explanation is omitted.

The material device 4 is a device that contains the sheets P to be used in the printer 2 and has a displaying function of displaying information regarding the sheets P to be used in the printer 2. The detailed configuration of the material device 4 will be described later.

The information processing apparatus 5 is an apparatus that operates as a management apparatus that manages the one or more printers 2 that execute a printing process according to a printing plan. The information processing apparatus 5 executes a process for providing information for assisting each printer 2 in executing scheduled printing processes. The information processing apparatus 5 provides information for assisting in printing plan implementation on the basis of, for example, the quantity of sheets contained in the printer 2 and a sheet quantity estimated for the printing plan. As an example of a process for assisting in the scheduled printing process implementation, processes related to making a printing plan in each printer 2 and providing information to be prepared for implementing the printing plan are cited. Information processing performed by the information processing apparatus 5 will be described later.

Figure 2:
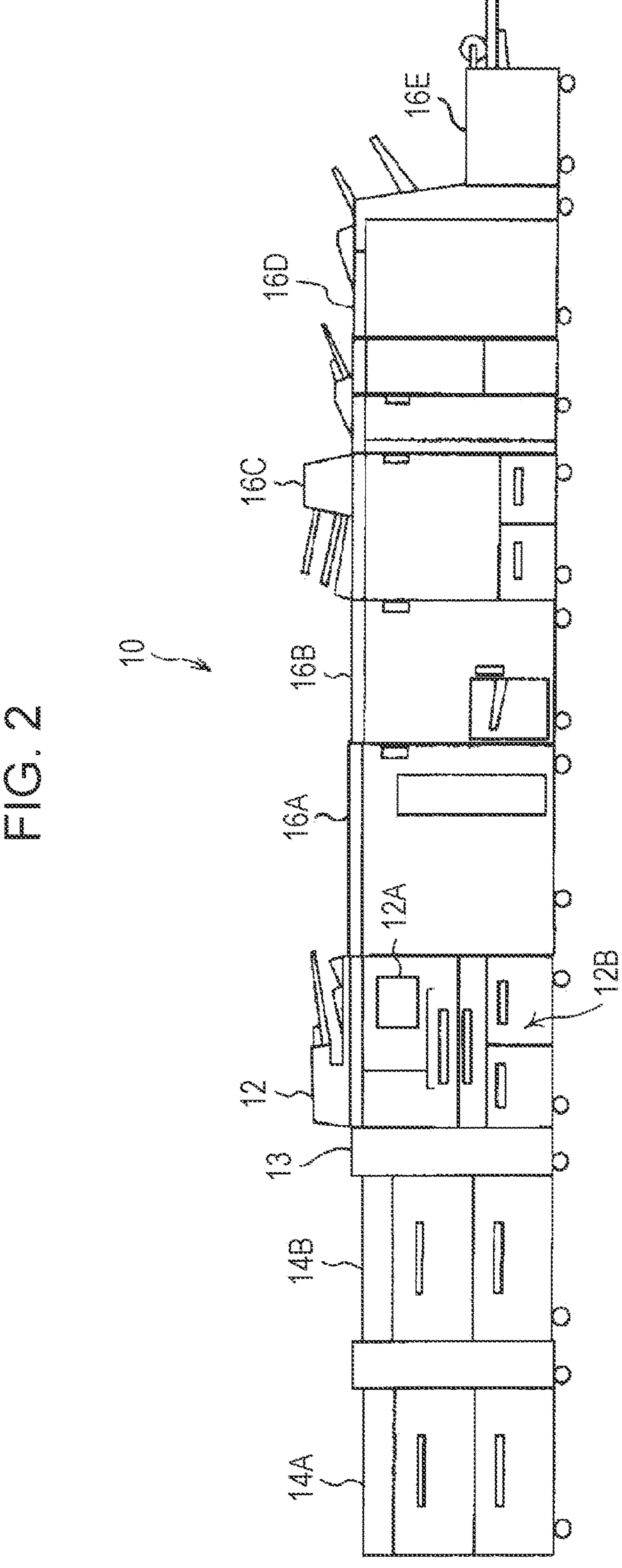
FIG. 2 is a view illustrating the schematic configuration of an image forming system according to the exemplary embodiment.

FIG. 2 is a view illustrating the schematic configuration of the image forming system 10 serving as an example of a printer of the present disclosure.

To implement various unique functions related to image forming, the image forming system 10 includes an image forming apparatus 12, a coupling device 13, feeder devices 14A and 14B, and post-processing devices 16A, 16B, 16C, 16D, and 16E serving as finishers.

The feeder devices 14A and 14B are each a sheet feeder device for supplying the image forming apparatus 12 with sheets from the outside of the image forming apparatus 12. The post-processing devices 16A, 16B, 16C, 16D, and 16E are devices for performing post-processing on sheets on which the image forming apparatus 12 forms images and thereafter discharging the sheets, for example, for stapling, punching, folding a sheet (in two or three), gluing, and trimming.

The image forming apparatus 12 is an apparatus for forming (printing) an image on a sheet by forming an image on the intermediate transfer body on the basis of image data and then transferring the image formed on the intermediate transfer body onto the sheet. The image forming apparatus 12 thus forms an image on the supplied sheet P and discharges a sheet having the image formed thereon to the outside of the image forming apparatus 12.

The image forming apparatus 12 includes an image forming unit 12A that forms an image on the sheet and a sheet container unit 12B for supplying the image forming unit 12A with a sheet contained in the image forming apparatus 12.

The image forming unit 12A includes a photoconductor, a charger, a light beam scanner, a developer, an intermediate transfer body, a transfer device, a discharger and cleaner, a transfer device, and a fuser (not illustrated) and is designed to form an image.

The sheet container unit 12B is capable of supplying the image forming unit 12A with the same type or different types of sheets P. The sheet container unit 12B may include multiple sheet container units formed from multiple trays (not illustrated). For example, the sheet container unit 12B may include multiple (for example, four) sheet container units formed from (not illustrated) multiple (for example, four) trays to allow the same type or different types of sheets to be contained in the corresponding sheet container units.

The image forming apparatus 12 receives a sheet supplied from one of the feeder devices 14A and 14B connected via the coupling device 13 or the sheet container unit 12B. Hereinafter, a case of supplying a sheet from the sheet container unit 12B in the image forming apparatus 12 will be described as an example.

To the image forming apparatus 12, the post-processing devices 16A, 16B, 16C, 16D, and 16E serving as the finishers are connected. The sheet having an image formed thereon by the image forming apparatus 12 undergoes the post-processing by the post-processing devices 16A to 16E and thereafter are discharged.

The image forming system 10 above includes a controller (not illustrated) that individually or comprehensively controls the various unique functions related to image forming by using a CPU (not illustrated) but is implementable by using a known configuration including a general computer, and thus detailed explanation is omitted.

An example of the material device 4 will then be described.

Figure 3:
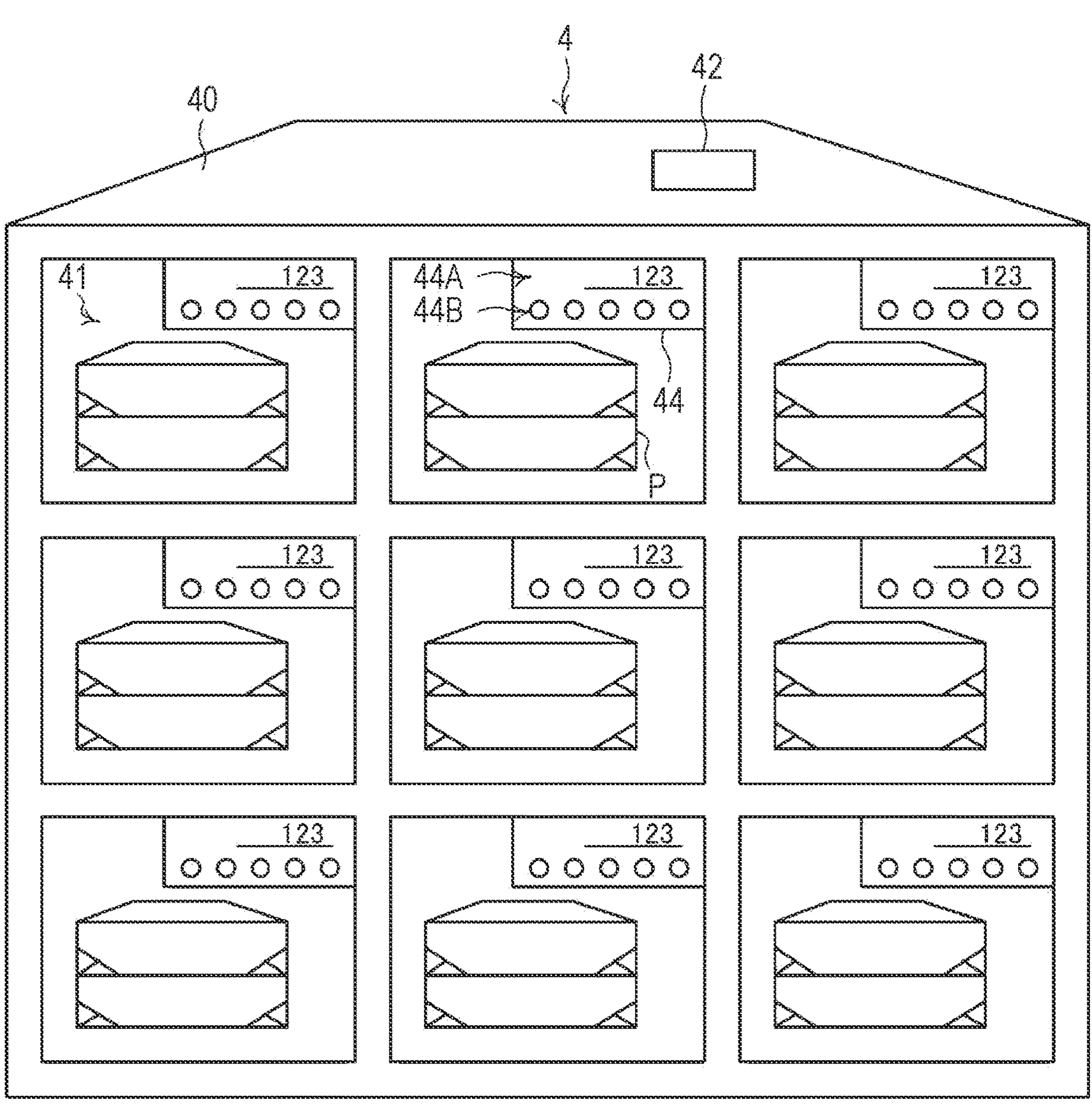
FIG. 3 is a view illustrating the schematic configuration of a material device according to the exemplary embodiment.

FIG. 3 is a view illustrating the schematic configuration of the material device 4 according to this exemplary embodiment.

The material device 4 includes a cabinet 40 having container spaces 41 capable of containing the sheets P, a controller 42 that controls information related to the sheets P, and displays 44.

Each display 44 is disposed on a corresponding one of the container spaces 41 for the sheets P and displays information regarding the sheets P contained in the container space 41 on the basis of information from the information processing apparatus 5. The display 44 is connected to the controller 42 and includes a first display 44A and a second display 44B that display information from the controller 42. The first display 44A displays information indicating a sheet quantity. In the illustrated example, the first display 44A displays the quantity of the sheets P to be transported to the printer 2, the quantity being received from the information processing apparatus 5. The second display 44B is designed to display information for identifying a takeout target (for example, for a user) to transport the sheets P from the container space 41. In the illustrated example, the second display 44B is provided with five indicators that light in different respective colors, and one of the indicators lights. The colors of the indicators of the second display 44B are predetermined for respective users. Referring to the display 44 in the material device 4 enables a user to make sure of the quantity of the sheets P and the location thereof. In a case of automatic transportation with the transport palette 34 above, it suffices that information indicating the quantity and the number of the corresponding sheets P is transmitted to the transport palette 34. Operation of the material device 4 will be described later.

An example of the information processing apparatus 5 will then be described.

Figure 4:
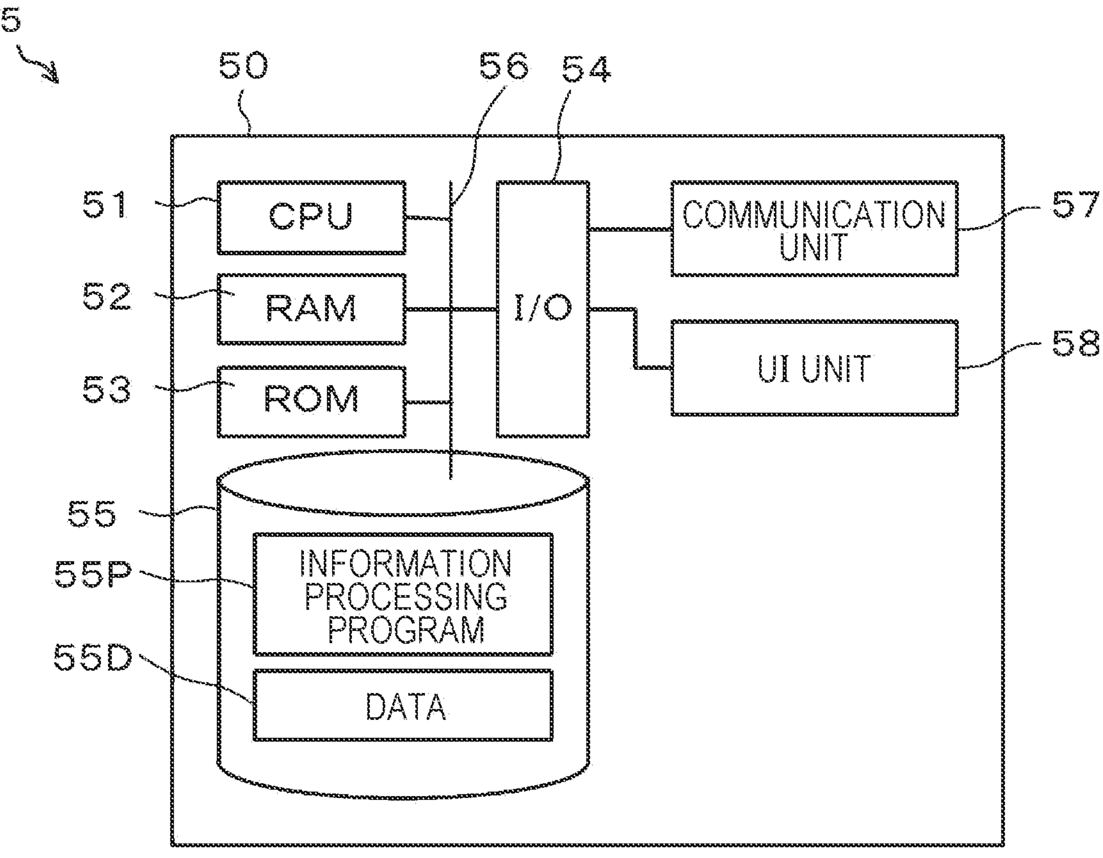
FIG. 4 is a view illustrating an example electrical configuration of an information processing apparatus according to the exemplary embodiment.

FIG. 4 is a view illustrating an example electrical configuration of the information processing apparatus 5.

The information processing apparatus 5 includes a computer 50 that performs information processing. The computer 50 includes a CPU 51, a RAM 52, a ROM 53, and an input/output port (I/O) 54 that are connected to each other via a bus 56. A memory 55 implementable by a hard disk drive (HDD), a nonvolatile flash memory, and the like are connected to the bus 56. In the configuration, a communication unit 57 and a user interface (UI) unit 58 are connectable to the I/O 54, the UI unit 58 including a display device such as a touch panel and serving as an operation unit.

The communication unit 57 is able to transmit and receive information for assisting in executing the scheduled printing processes in such a manner as to be connected to the printer 2, the transport device 3, and the material device 4 via the network NT.

The memory 55 stores an information processing program 55P that performs information processing for assisting in executing the scheduled printing processes (described later). The CPU 51 executes each process in such a manner as to read out the information processing program 55P from the memory 55 and load the information processing program 55P into the RAM 52. The computer 50 running the information processing program 55P thereby operates as the information processing apparatus of the present disclosure. The information processing program 55P may be provided by using a recording medium such as a CD-ROM. The memory 55 also stores data 55D to be used in the information processing.

In a place where printing processes are executed, printing materials including consumables to be used for the printing processes are prepared in advance. Since printing material shortage causes interruption of a printing process, printing materials sufficient to execute the printing processes are preferably prepared. However, diverse printing processes recently supported have led to diverse printing material preparations. In addition, in the place where printing processes are executed, scheduled printing processes are executed in some cases according to a printing plan by which the printing processes are scheduled for printing operation shifts on a per day or hour basis. This case requires preparing printing materials according to the printing plan. Supporting these diverse printing processes and executing the printing processes according to the printing plan burden a user who prepares the printing materials and are likely to interrupt a printing process. Hence, this exemplary embodiment provides an information processing apparatus configured above and thus enabled to reduce printing process interruptions. This exemplary embodiment enables sheet preparation that enables printing processes to be executed according to the printing plan and also enables workload for sheet to be reduced.

The configuration of the information processing apparatus 5 enabled to reduce the printing process interruptions will then be described further.

Figure 5:
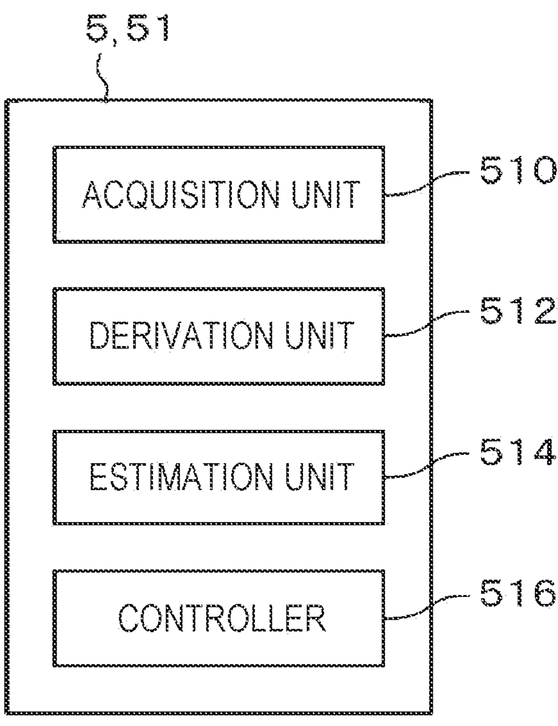
FIG. 5 is a view illustrating an example functional configuration of the information processing apparatus according to the exemplary embodiment.

FIG. 5 is a view illustrating an example functional configuration of the information processing apparatus 5 according to this exemplary embodiment.

The information processing apparatus 5 includes an acquisition unit 510, a derivation unit 512, an estimation unit 514, and a controller 516 that are functional units. The CPU 51 of the information processing apparatus 5 runs the information processing program 55P, and thereby the information processing apparatus 5 functions as the acquisition unit 510, the derivation unit 512, the estimation unit 514, and the controller 516.

The acquisition unit 510 is a functional unit that acquires plan information indicating a plan for printing processes to be executed with a printer in a predetermined processing time such as one day. The acquisition unit 510 also has a function of acquiring, as actual quantity information, sheet information indicating the quantity of the sheets P loaded in the printer 2, that is, sheet information regarding the quantity of the sheets P that allows the printing processes to be executed by the printer 2.

The sheet information is information indicating the quantity of sheets and includes information indicating one or more types of the sheets such as the material, the mass, and the size of the sheets P and the number of sheets.

The derivation unit 512 is a functional unit that derives, as planned quantity information, sheet information indicating the quantity of the sheets P in executing the printing processes according to the printing process plan on the basis of the plan information acquired by the acquisition unit 510.

The estimation unit 514 is a functional unit that estimates, as estimated quantity information, sheet information indicating the quantity of the sheets P for implementing the printing process plan, on the basis of the planned quantity information derived by the derivation unit 512 and the actual quantity information acquired by the acquisition unit 510.

The controller 516 is a functional unit that performs control to make a notification of the estimated quantity information estimated by the estimation unit 514.

The information processing performed by the information processing apparatus 5 of this exemplary embodiment will then be described in detail.

Figure 6:
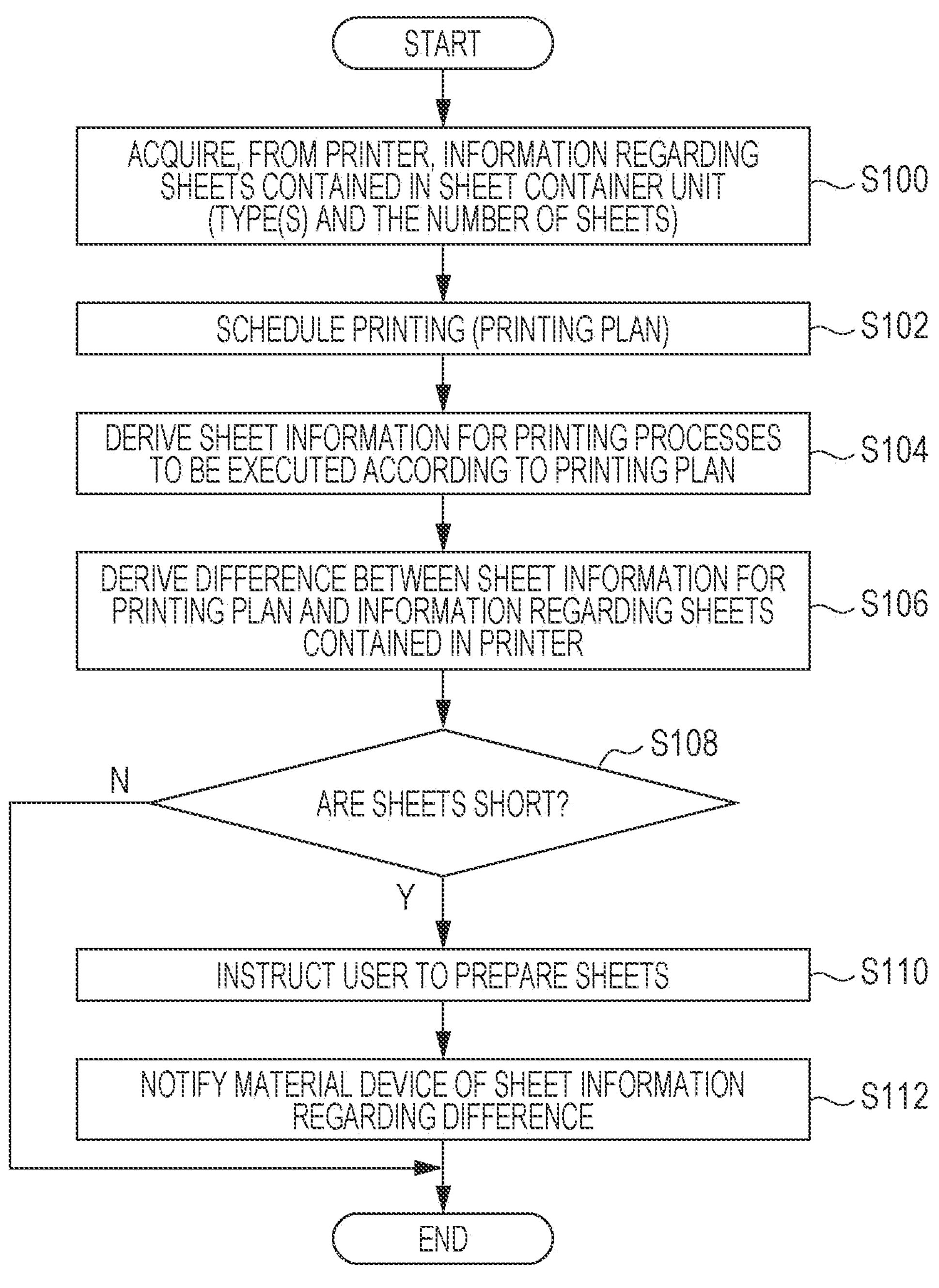
FIG. 6 is a flowchart illustrating example information processing performed by the information processing apparatus according to the exemplary embodiment.

FIG. 6 is a flowchart illustrating example information processing performed by the information processing apparatus 5. The information processing illustrated in FIG. 6 is performed in response to the receiving of an instruction from the user via the UI unit 58. The timing for the information processing is not limited to the time when the instruction from the user is received, and the information processing may be performed automatically, for example, regularly every predetermined time. The processing routine illustrated in FIG. 6 is executed by the CPU 51 of the information processing apparatus 5.

Figure 7:
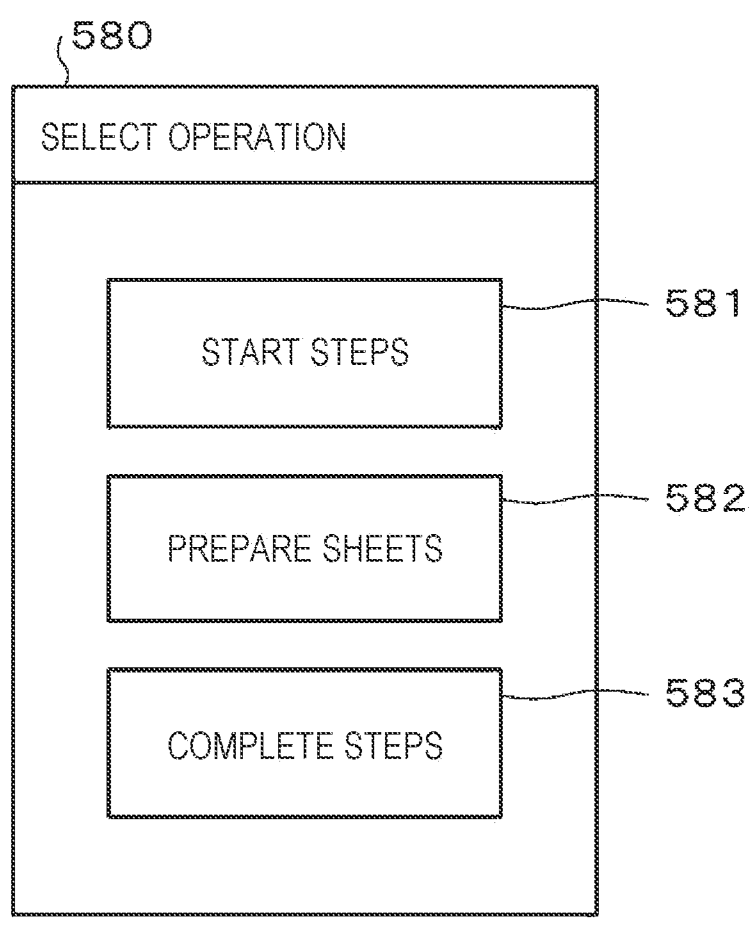
FIG. 7 is a conceptual view illustrating an example display screen according to the exemplary embodiment.
Figure 8:
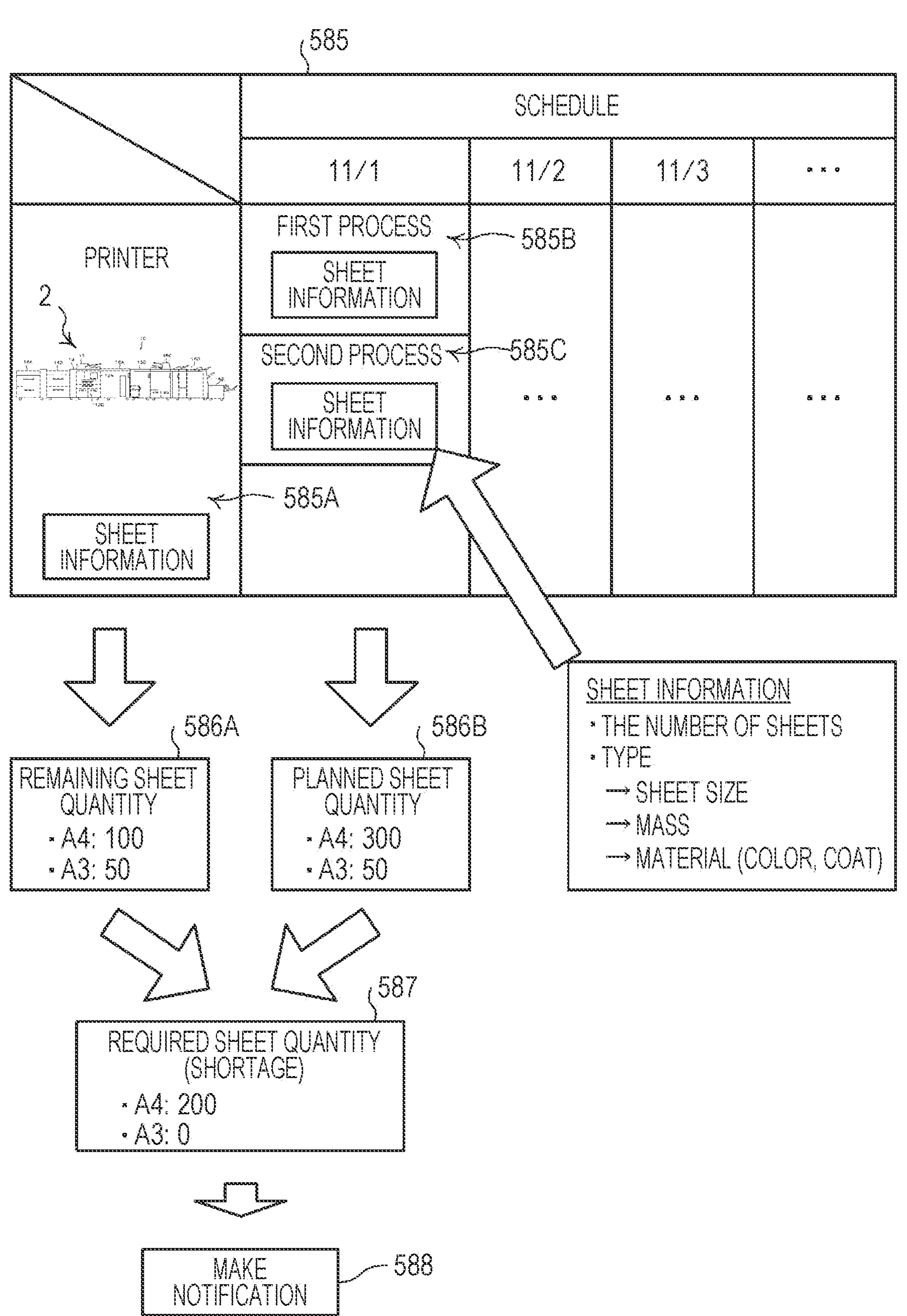
FIG. 8 is a conceptual view illustrating an example display screen according to the exemplary embodiment.

FIG. 7 is a conceptual view illustrating an example display screen including an instruction for user' selection of an operation for the scheduled printing plan. FIG. 8 is a conceptual view illustrating an example display screen including the scheduled printing plan.

As illustrated in FIG. 7, a display screen 580 includes instruction buttons that are a START STEPS button 581, a PREPARE SHEETS button 582, and a COMPLETE STEPS button 583. The START STEPS button 581 is an instruction button by which starting steps of executing processes related to the preparation of the sheets P for the printer 2 is instructed for the scheduled printing plan. The PREPARE SHEETS button 582 is an instruction button for an instruction for a process including information notification of the preparation of the required sheets P for the printer 2 to external apparatuses (the transport device 3 and the material device 4 in this case). The COMPLETE STEPS button 583 is a button for an instruction for the completion of the steps above.

In response to the user pressing the START STEPS button 581, the information processing illustrated in FIG. 7 is started, and the scheduled plan information and the sheet information (actual quantity information) regarding the sheets P contained in the printer are acquired. The sheet information (planned quantity information) for implementing the printing plan is also estimated on the basis of the plan information. The estimated quantity information for implementing the printing plan in the printer 2 is then estimated on the basis of the planned quantity information and the actual quantity information.

Specifically, in response to receiving the instruction from the user (FIG. 7), the CPU 51 receives the sheet information regarding the sheet container unit 12B from the printer 2 in step S100 in FIG. 6. In step S100, the CPU 51 performs control to communicate with the printer 2 and acquires, as the actual quantity information, the sheet information indicating the quantity of the sheets P contained in the sheet container unit 12B of the printer 2. In this case, the CPU 51 acquires the one or more types and the number of sheets P indicated in the sheet information. Step S100 is an example of a process executed by the acquisition unit 510 (FIG. 5).

In step S102, the CPU 51 then schedules printing for the printer 2. The scheduling is a process for making a printing plan implemented in the one or more printers 2. In step S102, the CPU 51 generates, as plan information, information indicating a plan for printing processes to be executed by each printer 2 in a predetermined processing time such as one day and stores the plan information in the memory 55 (for example, the data 55D) (FIG. 8).

In step S104, the sheet information for the printing process to be executed according to the printing plan is derived. In step S104, the sheet information indicating the one or more types and the number of sheets P to be prepared for implementing the printing plan in executing the printing processes according to the printing plan is derived as the planned quantity information on the basis of the plan information in step S102. The planned quantity information may be derived by adding up the numbers of the sheets P based on the respective types of the sheets P to be prepared in the predetermined processing time such as one day. If the printing plan is scheduled for the printers 2, the planned quantity information is derived for each printer 2 individually. Step S104 is an example of a process executed by the derivation unit 512 (FIG. 5).

In step S106, the sheet information for implementing the printing plan in the printer 2 is estimated as the estimated quantity information on the basis of the sheet information for the printing plan (planned quantity information) and the sheet information regarding the sheets P contained in the printer (actual quantity information). In step S106, a difference between the sheet information for the printing plan (planned quantity information) and the sheet information regarding the sheets P contained in the printer (actual quantity information) is derived, and the derived sheet information is used as the estimated quantity information. For the difference, the number of sheets P is derived for each type. In step S106, information regarding the shortfall in the actual quantity information regarding the printer is derived compared with the planned quantity information for the printing plan to thereby estimate the type and the number of sheets to be short in implementing the printing plan. The estimated quantity information thus estimated is stored in the memory 55. Step S106 is an example of a process executed by the estimation unit 514 (FIG. 5).

In the example illustrated in FIG. 8, the display area of a schedule 585 based on the scheduled plan information includes a display area 585A where information regarding steps to be performed in the printer 2 on 11/1. A display area 585B and a display area 585C are also included. In the display area 585B and the display area 585C, information regarding a first process and information regarding a second process are respectively displayed as the printing process to be executed by the printer 2. The sheet information is displayed in each of the display areas 585A, 585B, and 585C.

In the display area 585A, the sheet information regarding the sheets P contained in the printer 2 is displayed as actual quantity information 586A. For the sheet information (planned quantity information) for the printing plan as described above, in the example illustrated in FIG. 8, sheet information regarding the total quantity in the first and second processes is displayed as planned quantity information 586B. The sheet information regarding a difference between the sheet information for the printing plan (planned quantity information) and the sheet information regarding the sheets P contained in the printer 2 (actual quantity information) is displayed as estimated quantity information 587 for implementing the printing plan in the printer 2.

After the estimation of the estimated quantity information indicating the difference above is completed, whether the estimation result in step S106 represents shortage is discriminated in step S108 in FIG. 6 and thereby it is determined whether the sheets P are short in implementing the printing plan. If one or more sheets are short, the determination has an affirmative result, and the processing moves to step S110. If the determination has a negative result in step S108, it is determined that the sheets P sufficient to implement the printing plan are contained in the printer 2, and then the processing routine is terminated.

If the determination has a negative result in step S108, the user may be notified of the determination result representing that the sheets P sufficient to implement the printing plan are contained in the printer 2.

If the sheets P are short in implementing the printing plan, control to instruct the user to prepare sheets in step S110 is performed. In step S110, control to notify the user that the sheets P sufficient to implement the printing plan are short and sheet preparation is required may be performed. In step S110, control to prompt the user to press the PREPARE SHEETS button 582 may also be performed. For example, the PREPARE SHEETS button 582 illustrated in FIG. 7 may be configured as follows. The PREPARE SHEETS button 582 is disabled before step S108 (in a state where pressing is not allowed). If the determination has an affirmative result in step S108, the PREPARE SHEETS button 582 is enabled (in a state where the pressing is allowed). In this case, in response to the user pressing the PREPARE SHEETS button 582, the processing moves to step S112.

In step S112, the information indicating the difference derived in step S106, that is, the sheet information indicating the shortfall in the quantity of the sheets P is notified to the transport device 3 and the material device 4 (a process 588 illustrated in FIG. 8), and then the processing routine is terminated. In step S112, the sheet information is notified with identification identifying the printer 2 added to the sheet information. The identification includes location information indicating the installation place of the printer 2 and the location of the sheet container unit 12B.

The processing routine illustrated in FIG. 6 may also be terminated in response to the pressing of the COMPLETE STEPS button 583 illustrated in FIG. 7.

Steps S110 and S112 above are an example of a process executed by the controller 516 (FIG. 5).

The transport device 3 receives the notification of the sheet information from the information processing apparatus 5, and the transport controller device 32 performs transport control of the transport palette 34 on the basis of the received sheet information. Specifically, the transport controller device 32 performs transport control to transport sheets based on the type indicated by the sheet information to the installation place of the printer 2 in the identification notified by the information processing apparatus 5, more specifically, to the location of the sheet container unit 12B.

Specifically, the transport palette 34 is first moved to the material device 4. When the transport palette 34 is moved to the material device 4, the transport controller device 32 may execute a process for taking out sheets from the container space 41 notified from the material device 4 and loading the sheets on the transport palette 34. The transport controller device 32 transports the sheets P loaded on the transport palette 34 to the installation place of the printer 2 in the identification. When the transport palette 34 is moved to the installation place of the printer 2, the transport controller device 32 may also execute a process for taking out the sheets P from the transport palette 34 and for putting the sheets P in the location where the sheets P are contained, for example, the sheet container unit 12B. After the end of the transportation of the sheets P, the transport controller device 32 moves the transport palette 34 to a predetermined standby location and then terminates the process.

In a case where the user transports the sheets P, the transport controller device 32 may display sheet information indicating the number of sheets P based on the type of the sheets P for each printer 2 to prompt the user to perform the transportation.

In the material device 4, the controller 42 receives the notification of the sheet information from the information processing apparatus 5. On the basis of the received sheet information, the controller 42 performs control to display, on the display 44, the received number of sheets P based on the type of the sheets P to be transported to the printer 2.

Specifically, the controller 42 of the material device 4 receives the notification of the sheet information from the information processing apparatus 5 and sets the type and the number of sheets P corresponding to the sheet information as well as one of the container spaces 41 that contains the number of sheets P based on the type thereof. On the basis of the identification notified together with the sheet information from the information processing apparatus 5, the controller 42 then sets information for identifying a takeout target (for example, for the user or the transport palette 34) to transport the sheets P from the container space 41 thus set. The controller 42 then performs control to display information on the display 44 of the container space 41 containing sheets P of the type and the quantity thus set. The controller 42 thus performs control to display the number of sheets on the first display 44A and light one of the five indicators of the second display 44B, the indicator identifying the takeout target (for example, for the user or the transport palette 34) for taking out the sheets P.

In the case where the sheets P are taken out by the transport palette 34 in the automatic process, the information regarding the container space 41 containing the sheets P to be taken out may be notified to the transport palette 34. In addition, the material device 4 may be provided with a loader that takes out the sheets P from the container space 41 and then loads the sheets P on the transport palette 34. In this case, it suffices that the controller 42 performs control to take out, from the container space 41, the sheets P the number of which is based on the notified sheet information, that is, the type thereof and then to load the sheets P on the transport palette 34.

In this exemplary embodiment as described above, in the case where printing processes are executed according to the printing plan, the quantity of the sheets P for implementing the printing plan in the printer 2 is estimated on the basis of the sheet quantity (the one or more types and the number of sheets) for the printing plan and the quantity of the sheets P contained in the printer 2. If the estimated sheet quantity (the number of sheets based on the type thereof) represents shortage in implementing the printing plan, the user is notified. To supply the sheets P of a sheet quantity as a shortfall (the one or more types and the number of sheets) to the printer 2, the transport device 3 and the material device 4 that are the external apparatuses are notified of the shortfall for the cooperation with the external apparatuses. Accordingly, in implementing the printing processes in the predetermined processing time, printing process interruptions may be reduced as compared with the case where the printing target such as sheets are prepared on the basis of only the information regarding the printer 2.

According to this exemplary embodiment, the user is notified of the shortfall in the number of the sheets P based on the type thereof in implementing the printing plan. This enables the user to make sure of the sheet quantity required for the printer 2 before the sheets P are short and the workload related to the sheet transportation to be reduced.

The case where the technology of the present disclosure is applied to the sheet quantity for the printer 2 has been described for the exemplary embodiment above, but it goes without saying that the technology is applicable to the sheet quantity for each of the multiple printers.

Other Exemplary Embodiments

The image forming system 10 has heretofore been described as an example of the printer but may be regarded as a complex printer composed of multiple printers related to printing. Specifically, if the printing function is implemented cooperatively, the image forming system 10 may be handled as one printer. In this case, sheets in each of the apparatuses that implements a corresponding one of unique functions serve as a printing target. Sheets input and output to and from the coupled apparatuses are shared by the apparatuses. Sheets discharged from an upstream apparatus serve as sheets input to a downstream apparatus.

In a case of executing a printing process to which independent printers are related, a printer group composed of the printers may be handled as one printer in which the printing function is cooperatively implemented. For example, the technology of the present disclosure is applicable to a printing process such as lamination printing performed on one sheet P by different printers that execute the same or different printing types of printing process.

Figure 9:
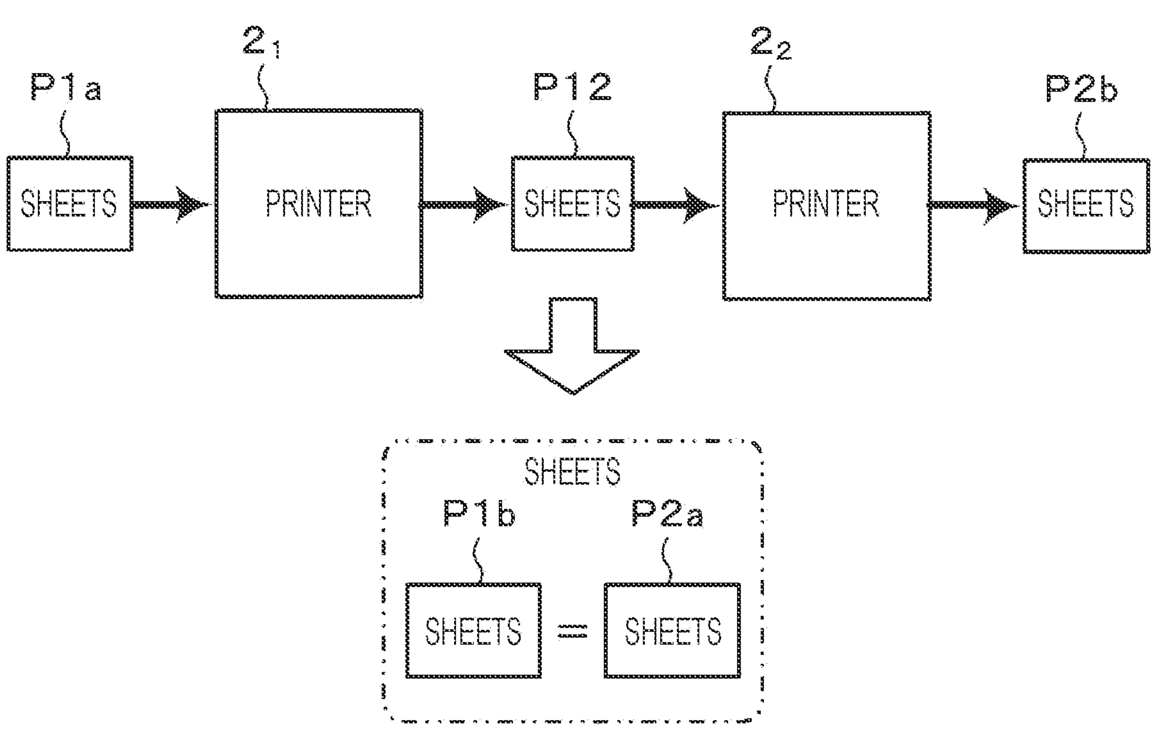
FIG. 9 is a conceptual view illustrating an example of printers that cooperatively implement a printing function according to the exemplary embodiment.

FIG. 9 is a conceptual view illustrating an example of printers that cooperatively implement the printing function. In the example illustrated in FIG. 9, a first printer $\mathbf{2}_1$ executes a printing process on sheets P1*a* and then discharges sheets P1*b*. A second printer $\mathbf{2}_2$ executes a printing process on the sheets P1*b* discharged from the first printer $\mathbf{2}_1$ in such a manner as to handle the sheets P1*b* as sheets P2*a* and then discharges sheets P2*b*. Between the printing process by the first printer $\mathbf{2}_1$ and the printing process by the second printer $\mathbf{2}_2$, the sheets P1*b* and the sheets P2*a* are handled as common sheets P12. In this case, the sheet information has the common sheets P12, and handled information amount may be reduced.

The case where the quantity of the sheets contained in the printer 2 is short for the printing plan has been described for the exemplary embodiment above; however, the present disclosure is not limited to the sheet quantity shortage. For example, the present disclosure is also applicable to a case of excessive sheet quantity. In this case, a sheet quantity representing excessive sheet quantity is predetermined. The user may be notified if the sheet quantity exceeds the predetermined excessive sheet quantity. Notifying the user in response to the excessive sheet quantity enables preparation meeting the printing plan to be provided neither too much nor too little.

Further, the case where the printing target quantity is applied to the sheet quantity has been described for the exemplary embodiment above; however, the present disclosure is not limited to the sheet quantity and is also applicable to the quantity of a subsidiary printing material related to the sheet quantity. As an example of the subsidiary printing material, a subsidiary printing material such as toner or ink that is increased as the sheet quantity is increased is cited. The subsidiary printing material such as the toner or the ink is contained in a container of a predetermined capacity and thus is preferably replaced before the occurrence of a toner or ink shortage. Applying the subsidiary printing material as the printing target quantity thus enables printing process interruptions to be reduced as compared with a case where the subsidiary printing material is not taken into consideration.

Accordingly, the technology of the exemplary embodiment includes the following aspects.

In an information processing apparatus including
- a processor configured to:
  - acquire plan information indicating a plan for a printing process to be executed by a printer in a predetermined processing time;
  - derive planned quantity information on a basis of the plan information, the planned quantity information indicating a printing target quantity in executing the printing process according to the plan;
  - acquire actual quantity information indicating a printing target quantity of a printing target placed in the printer, the printing target quantity allowing the printing process to be executed;
  - on a basis of the planned quantity information and the actual quantity information, estimate estimated quantity information indicating a printing target quantity for implementing the plan; and
  - perform control to make a notification of the estimated quantity information,
- the printing target is a sheet, and the printing target quantity includes a quantity of a subsidiary printing material (toner or ink) for the sheet in executing the printing process on the sheet, and
- the processor is configured to:
  - estimate, as the estimated quantity information, information indicating the quantity of the subsidiary printing material.

Further, the information processing performed by the information processing apparatus such as the server has been described for the exemplary embodiment above; however, the technology of the present disclosure is not limited to this. For example, a configuration in which the information processing apparatus that executes the information processing above is included in one of the printers 2 may be employed.

The technology of the present disclosure has heretofore been described in detail regarding the specific exemplary embodiment; however, the technology of the present disclosure is not limited to the exemplary embodiment. Any various different exemplary embodiments may be provided without departing from the scope of the technology of the present disclosure.

The process executed by running the program stored in the memory has been described for the exemplary embodiment above; however, the process of the program may be implemented by hardware. In addition, for example, part of the process of the program may be implemented by a hardware configuration. The process may be implemented by a combined configuration of hardware and software.

The information processing apparatus according to the exemplary embodiment has heretofore been illustrated and described. In a mode of the exemplary embodiment, the exemplary embodiment may be a program causing a computer to implement the functions of the components of the information processing apparatus. The exemplary embodiment may be recording medium such as an optical disk readable by the computer storing the program.

The configuration of the information processing apparatus described for the exemplary embodiment above is an example and may be modified in accordance with the circumstances without departing from the spirit of the exemplary embodiment. The flow of the processing performed in accordance with the program described for the exemplary embodiment above is also an example. A deletion of an unnecessary step, an addition of a new step, a change of the order of the steps, and the like may be performed without departing from the spirit of the exemplary embodiment.

In the present disclosure, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus including:

a processor configured to:

acquire plan information indicating a plan for a printing process to be executed by a printer in a predetermined processing time;

derive planned quantity information on a basis of the plan information, the planned quantity information indicating a printing target quantity in executing the printing process according to the plan;

acquire actual quantity information indicating a printing target quantity of a printing target placed in the printer, the printing target quantity allowing the printing process to be executed;

on a basis of the planned quantity information and the actual quantity information, estimate estimated quantity information indicating a printing target quantity for implementing the plan; and perform control to make a notification of the estimated quantity information.

(((2)))

In the information processing apparatus according to (((1))), the processor is configured to:

estimate, as the estimated quantity information, information indicating a shortfall in the printing target quantity in the actual quantity information compared with the planned quantity information.

(((3)))

In the information processing apparatus according to (((2))), the printing target is a sheet, and the printing target quantity includes a count of the sheet, and the processor is configured to:

estimate information indicating the count of the sheet as the estimated quantity information.

(((4)))

In the information processing apparatus according to (((2))), the printing target is a sheet, and a quantity of the sheet includes a count of the sheet on a per-sheet-type basis, and the processor is configured to:

estimate, as the estimated quantity information, information indicating the count of the sheet on the per-sheet-type basis.

(((5)))

In the information processing apparatus according to any one of (((1))) to (((4))), the processor is configured to:

perform control to notify a responsible device responsible for supplying the sheet to the printer of the estimated quantity information.

(((6)))

In the information processing apparatus according to any one of (((1))) to (((5))), the processor is configured to:

the printer includes multiple different printers, and the processor is configured to:

estimate the printing target quantity for each of the multiple printers.

(((7)))

In the information processing apparatus according to (((6))), the multiple printers include a first printer that acquires first resultant matter in a first printing process and a second printer that acquires second resultant matter by using the first resultant matter, and the processor is configured to:

derive first planned quantity information and second planned quantity information on a basis of the plan information, the first planned quantity information and the second planned quantity information each indicating a corresponding one of printing target quantities for the first printer and the second printer in executing the printing process according to the plan;

acquire first actual quantity information and second actual quantity information, the first actual quantity information and the second actual quantity information each indicating a corresponding one of printing target quantities allowing the first printer and the second printer to execute the printing process;

estimate first estimated quantity information and second estimated quantity information each indicating a corresponding one of printing target quantities for implementing the plan, the first estimated quantity information being estimated on a basis of the first planned quantity information and the first actual quantity information, the second estimated quantity information being estimated on a basis of the second planned quantity information and the second actual quantity information; and perform control to make a notification of information regarding the first estimated quantity information and the second estimated quantity information that are estimated.

(((8)))

In the information processing apparatus according to (((7))), the processor is configured to:

make the notification of only the first estimated quantity information as information regarding the first estimated quantity information and the second estimated quantity information.

(((9)))

In the information processing apparatus according to any one of (((1))) to (((8))), the processor is configured to:

perform control to display, as the notification, information indicating an estimated quantity of a printed material.

(((10)))

A program causes a computer to execute a process including:

acquiring plan information indicating a plan for a printing process to be executed by a printer in a predetermined processing time;

deriving planned quantity information on a basis of the plan information, the planned quantity information indicating a printing target quantity in executing the printing process according to the plan;

acquiring actual quantity information indicating a printing target quantity allowing the printing process to be executed;

on a basis of the planned quantity information and the actual quantity information, estimating estimated quantity information indicating a printing target quantity for implementing the plan; and performing control to make a notification of the estimated quantity information.

What is claimed is:

1. An information processing apparatus comprising:

a processor configured to:

acquire plan information indicating a plan for a printing process to be executed by a printer in a predetermined processing time;

derive planned quantity information on a basis of the plan information, the planned quantity information indicating a printing target quantity in executing the printing process according to the plan;

acquire actual quantity information indicating a printing target quantity of a printing target placed in the printer, the printing target quantity allowing the printing process to be executed;

on a basis of the planned quantity information and the actual quantity information, estimate estimated quantity information indicating a printing target quantity for implementing the plan; and perform control to make a notification of the estimated quantity information, wherein the processor is configured to perform control to display, as the notification, information indicating an estimated quantity of a printed material, and the notification indicates a shortage in the printing target quantity required for implementing the plan.

2. The information processing apparatus according to claim 1, wherein the processor is configured to:

estimate, as the estimated quantity information, information indicating the shortage in the printing target quantity in the actual quantity information compared with the planned quantity information.

3. The information processing apparatus according to claim 2, wherein the printing target is a sheet, and the printing target quantity includes a count of the sheet, and wherein the processor is configured to:

estimate information indicating the count of the sheet as the estimated quantity information.

4. The information processing apparatus according to claim 2, wherein the printing target is a sheet, and a quantity of the sheet includes a count of the sheet on a per-sheet-type basis, and wherein the processor is configured to:

estimate, as the estimated quantity information, information indicating the count of the sheet on the per-sheet-type basis.

5. The information processing apparatus according to claim 1, wherein the processor is configured to:

perform control to notify a responsible device responsible for supplying a sheet to the printer of the estimated quantity information.

6. The information processing apparatus according to claim 1, wherein the printer includes a plurality of different printers, and wherein the processor is configured to:

estimate the printing target quantity for each of the plurality of printers.

7. The information processing apparatus according to claim 6, wherein the plurality of printers include a first printer that acquires first resultant matter in a first printing process and a second printer that acquires second resultant matter by using the first resultant matter, and wherein the processor is configured to:

derive first planned quantity information and second planned quantity information on a basis of the plan information, the first planned quantity information and the second planned quantity information each indicating a corresponding one of printing target quantities for the first printer and the second printer in executing the printing process according to the plan;

acquire first actual quantity information and second actual quantity information, the first actual quantity information and the second actual quantity information each indicating a corresponding one of printing target quantities allowing the first printer and the second printer to execute the printing process;

estimate first estimated quantity information and second estimated quantity information each indicating a corresponding one of printing target quantities for implementing the plan, the first estimated quantity information being estimated on a basis of the first planned quantity information and the first actual quantity information, the second estimated quantity information being estimated on a basis of the second planned quantity information and the second actual quantity information; and perform control to make a notification of information regarding the first estimated quantity information and the second estimated quantity information that are estimated.

8. The information processing apparatus according to claim 7, wherein the processor is configured to:

make the notification of only the first estimated quantity information as information regarding the first estimated quantity information and the second estimated quantity information.

9. A non-transitory computer readable medium storing a program causing a computer to execute a process comprising:

acquiring plan information indicating a plan for a printing process to be executed by a printer in a predetermined processing time;

deriving planned quantity information on a basis of the plan information, the planned quantity information indicating a printing target quantity in executing the printing process according to the plan;

acquiring actual quantity information indicating a printing target quantity allowing the printing process to be executed;

on a basis of the planned quantity information and the actual quantity information, estimating estimated quantity information indicating a printing target quantity for implementing the plan; and performing control to make a notification of the estimated quantity information, wherein as the notification, information indicating an estimated quantity of a printed material is displayed, and the notification indicates a shortage in the printing target quantity required for implementing the plan.

10. An information processing apparatus comprising:

processing means for:

acquiring plan information indicating a plan for a printing process to be executed by a printer in a predetermined processing time;

deriving planned quantity information on a basis of the plan information, the planned quantity information indicating a printing target quantity in executing the printing process according to the plan;

acquiring actual quantity information indicating a printing target quantity of a printing target placed in the printer, the printing target quantity allowing the printing process to be executed;

on a basis of the planned quantity information and the actual quantity information, estimating estimated quantity information indicating a printing target quantity for implementing the plan; and performing control to make a notification of the estimated quantity information, wherein the processing means performs control to display, as the notification, information indicating an estimated quantity of a printed material, and the notification indicates a shortage in the printing target quantity required for implementing the plan.

* * * * *